July 15, 1958 J. R. BORDEN ET AL 2,842,967

GYROSCOPIC DEVICE

Filed Oct. 10, 1955 8 Sheets-Sheet 1

INVENTORS,
Jay R. Borden &
Arne M. Harja
BY
Fred N. Schwend
ATTORNEY.

INVENTORS,
Jay R. Borden &
Arne M. Harja

BY

ATTORNEY.

INVENTORS,
Jay R. Borden &
Arne M. Harja
BY
[signature]
ATTORNEY.

INVENTORS,
Jay R. Borden &
Arne M. Harja
BY
Fred M. Schwend
ATTORNEY.

July 15, 1958 J. R. BORDEN ET AL 2,842,967

GYROSCOPIC DEVICE

Filed Oct. 10, 1955 8 Sheets-Sheet 5

INVENTORS,
Jay R. Borden &
Arne M. Harja

BY

ATTORNEY.

July 15, 1958 J. R. BORDEN ET AL 2,842,967

GYROSCOPIC DEVICE

Filed Oct. 10, 1955 8 Sheets-Sheet 6

INVENTORS,
Jay R. Borden &
Arne M. Harja

BY

ATTORNEY.

July 15, 1958 J. R. BORDEN ET AL 2,842,967

GYROSCOPIC DEVICE

Filed Oct. 10, 1955 8 Sheets-Sheet 7

INVENTORS,
Jay R. Borden &
Arne M. Harja

BY Fred N. Schwend
ATTORNEY.

July 15, 1958 J. R. BORDEN ET AL 2,842,967

GYROSCOPIC DEVICE

Filed Oct. 10, 1955 8 Sheets-Sheet 8

INVENTORS,
Jay R. Borden &
Arne M. Harja

BY

ATTORNEY.

United States Patent Office 2,842,967
Patented July 15, 1958

2,842,967

GYROSCOPIC DEVICE

Jay R. Borden, Pasadena, and Arne M. Harja, San Gabriel, Calif., assignors to Clary Corporation, San Gabriel, Calif., a corporation of California Application October 10, 1955, Serial No. 539,316

4 Claims. (Cl. 74—5.1)

This invention relates to gyroscopes and has particular reference to gyroscopic instruments used in aircraft, guided missiles and the like, wherein freedom of movement is necessary about more than one axis in order to effect proper indication or control.

One object of the present invention is to provide a gyroscope of the above type wherein different units of the gyroscope may be removed or replaced without disturbing the adjustment or setting of other units.

Another object is to provide a caging mechanism for a gyroscope of the above type wherein the jarring or violent action normally found in gyroscope caging actions is reduced.

Another object is to provide a gyroscope of the above type which is economical to manufacture, easy to assemble and yet which embodies a high degree of reliability.

The manner in which the above and other objects of the invention are accomplished will be readily understood on reference to the following specification when read in conjunction with the accompanying drawings, wherein.

Figure 18:
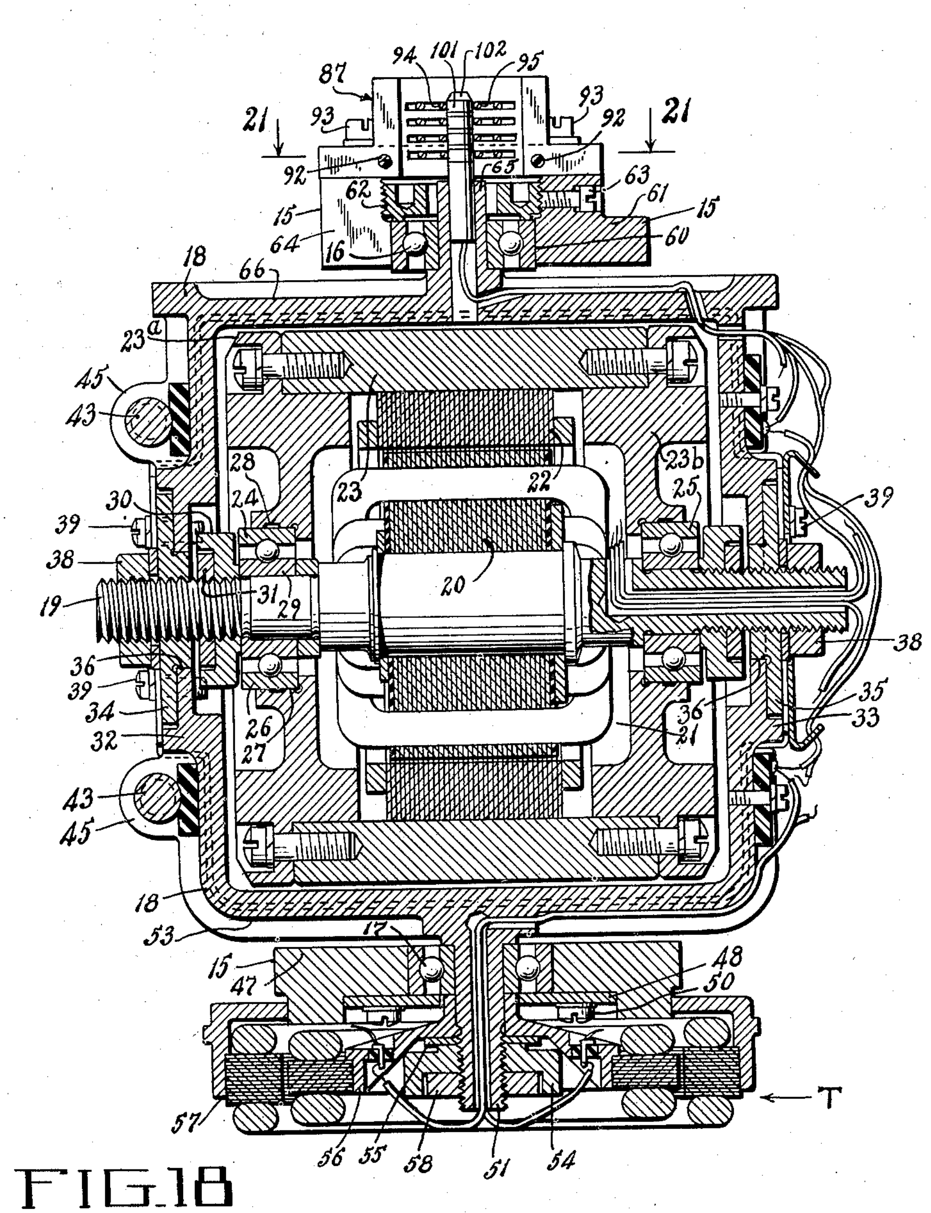
Fig. 18 is a sectional view through the inner and outer gimbal assemblies and is taken along the line 18—18 of Fig. 10.
Figure 19:
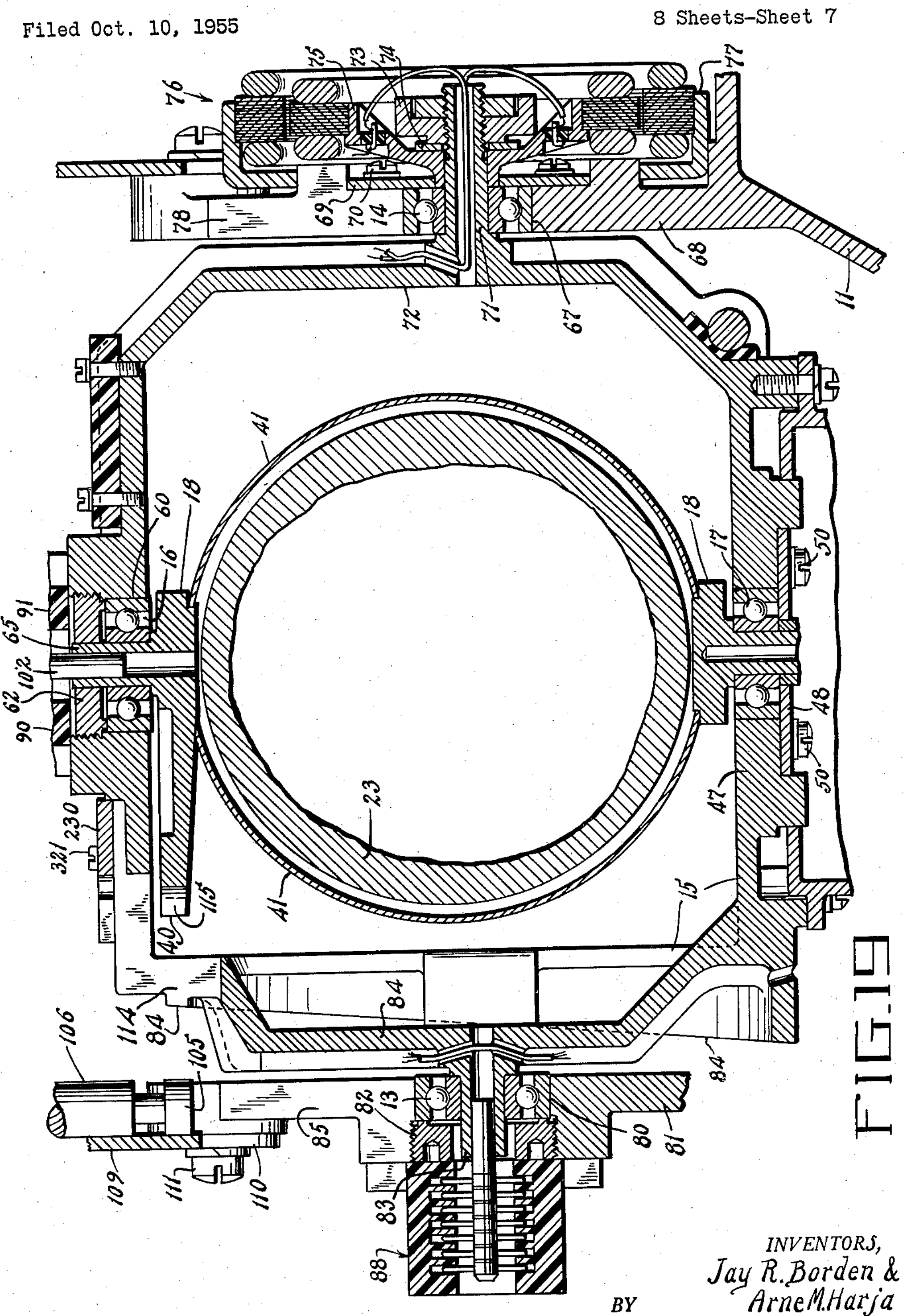
Fig. 19 is a sectional view taken along line 19—19 of Fig. 7.

The gyro comprises generally a base 11, Figs. 1, 2, 6, 7 and 19 in which are mounted ball bearings 13 and 14 for rotatably supporting an outer gimbal 15. The latter, in turn, has mounted therein ball bearings 16 and 17 pivotally supporting an inner gimbal 18 (see also Fig. 18) for movement about an axis mutually perpendicular to the pivotal axis of the outer gimbal. The inner gimbal has secured thereto a motor shaft 19 carrying the stator 20 of a motor 21. The rotor 22 of the motor is suitably secured to a fly wheel mass 23. The latter has side flanges **23*a* and 23*b* which are rotatably supported on ball bearings 24 and 25, respectively, mounted on the shaft 19**.

In order to properly secure the bearings 24 and 25 in place, the outer race 26 of each bearing is fitted in a counterbored opening 27 in its respective flange on the fly wheel mass 23. An annular groove 28 is formed in the opening and is filled with a suitable adhesive to prevent creeping of such outer race during rotation. The inner races 29 of the bearings are clamped against shouldered center portions of the shaft 19 by clamp nuts 30 threaded on the shaft. Lock nuts 31 maintain clamp nuts in place.

The opposite ends of the shaft 19 are removably secured to opposite sides 32 and 33 of the inner gimbal 18 by flanges 34 and 35, respectively. The latter are threaded on respective ends of the shaft and each has a reduced bearing section fitted snugly within an opening 36 in the corresponding side of the inner gimbal 18 (see also Figs. 13 and 14).

Figures 13, 14:
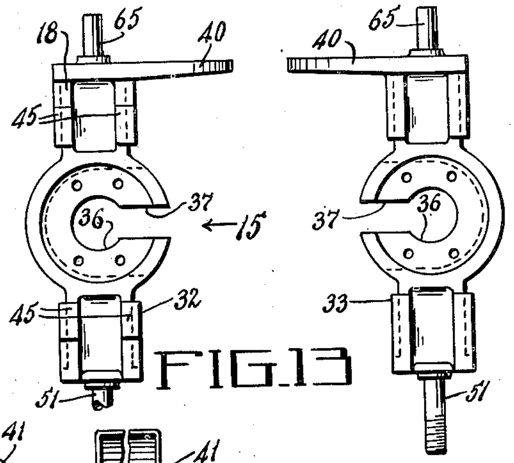
Figs. 13 and 14 are opposite end views of the inner gimbal.

It will be noted on reference to Figs. 13 and 14 that a transverse open slot 37 of a width slightly larger than the diameter of the outer end portions of shaft 19 is formed in the inner gimbal sides 32 and 33 and communicates with the respective opening 36 whereby when the flanges 34 and 35 are backed off, the entire motor assembly including the fly wheel mass 23 may be removed and replaced laterally by moving the shaft 19 through the slots 37.

Each flange is held in place on the shaft 19 by a lock nut 38 and is secured against the respective side of the inner gimbal 18 by clamp screws 39.

Figure 15:
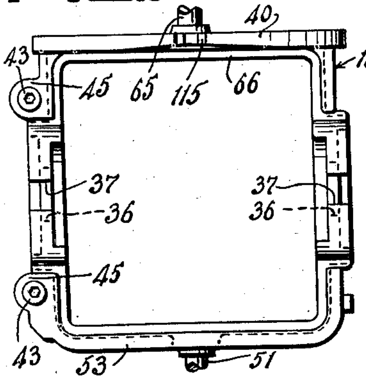
Fig. 15 is a side view of the inner gimbal as viewed in the direction of the arrow 15 in Fig. 13.

It will be noted that the inner gimbal 18 is rectangular in shape when viewed from the side, as seen in Fig. 15, to provide a rigid gimbal structure, the top cross piece comprising a caging cam 40 to be described later.

Figure 16:
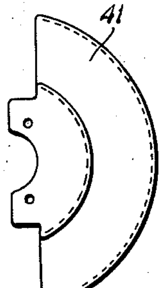
Fig. 16 is an end view of one shell forming part of the motor shield.
Figure 17:
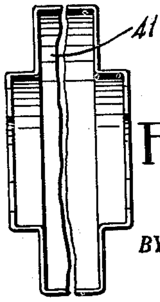
Fig. 17 is a side view, partly broken away, of one of the shells.

An air shield is provided to enclose the motor and rotating fly wheel 23. The shield comprises two thin semi-cylindrical shells 41 (Figs. 16 and 17) held in place on opposite sides of the inner gimbal 18 by the clamp screws 39.

Two sets of balancing screws 43 and 44 (Figs. 10 and 18) are provided to balance the inner gimbal and parts carried thereby. The screws 43 are threadably mounted in bosses 45 formed integrally with side 32 of the inner gimbal and are adjustable transversely of the axis of the fly wheel. The balancing screws 44 are threadably mounted on bosses 46 formed integral with one of the air shield shells 41 and are adjustable longitudinally of the axis of the fly wheel.

Figures 10, 11:
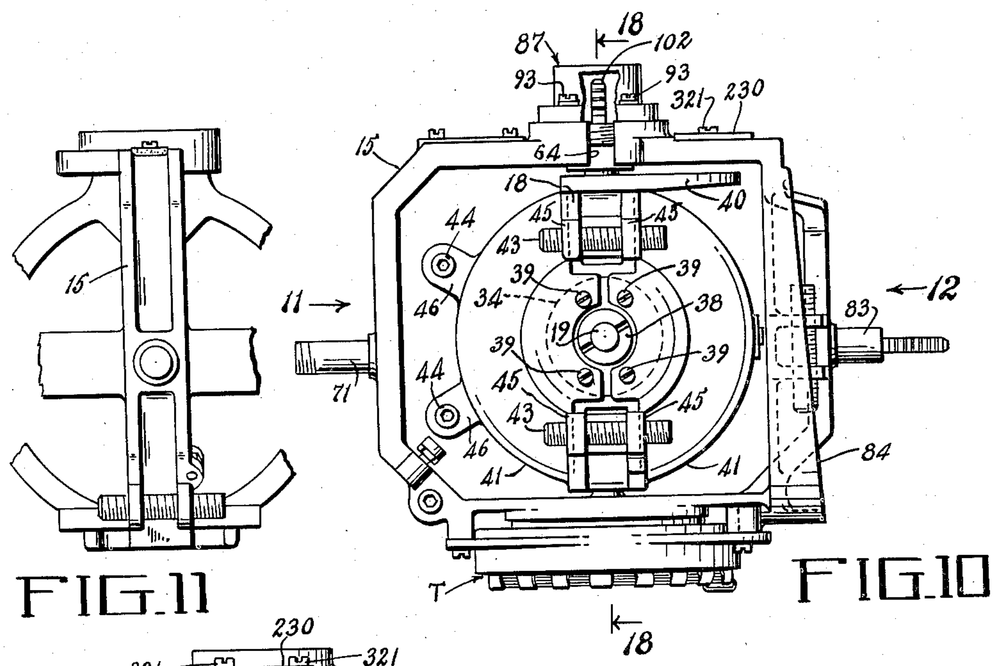
Fig. 10 is an elevational view illustrating the inner and outer gimbal assemblies, and is taken in the direction of the arrow 10 in Fig. 7.
Fig. 11 is a fragmentary view of the outer gimbal as viewed in the direction of the arrow 11 in Fig. 10.
Figure 12:
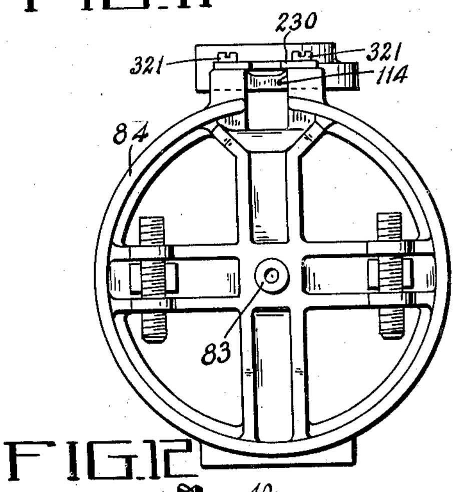
Fig. 12 is another view of the outer gimbal as viewed in the direction of the arrow 12 in Fig. 10.

Describing now the means for supporting the bearings 16 and 17 (Fig. 18) for the inner gimbal 18, it will be noted that the outer gimbal 15 (Figs. 10, 11 and 12) is substantially rectangular when viewed in Fig. 10 to provide a rigid outer gimbal structure, one side thereof being formed into a caging cam 84. The bearing 17 has its outer race snugly fitted in a hole formed in the bottom side 47 of the outer gimbal and is held in place by a plate 48 secured to the under surface of the side 47 by clamp screws 50. The inner race of bearing 17 is slideably fitted over a trunnion 51 formed integrally with the bottom cross piece 53 of the inner gimbal 18. This inner race is clamped in place on the trunnion 51 by a clamp nut 54 which bears against a washer 55 located against the side of a rotor 56. The latter forms part of a control transformer or synchro, generally indicated at T, and is held in place by a lock nut 58. The washer 55, in turn, bears against the rotor 56 which engages the inner race of the bearing 17. A stator element 57 of the control transformer T is suitably secured to the lower cross member 47 of the outer gimbal.

The upper bearing 16 has its outer race fitted in an opening 60 in the upper cross member 61 of the outer gimbal 15 and is held in place by an annular nut 62 threadably mounted in the cross member 61 and locked in place by a lock screw 63. An open slot 64 (see also Fig. 10) is formed in one side of the cross member 61 and opens into the bearing opening 60.

The inner race of the bearing 16 is fitted over a trunnion 65 formed integrally with the upper cross piece 66 of the inner gimbal and extending coaxially with the trunnion 51. When the nut 62 and bearing 16 is removed, the trunnion 65 may be passed laterally through the slot 64 in order to remove or replace the inner gimbal assembly without disturbing the outer gimbal.

The bearings 13 and 14 supporting the outer gimbal 15 are mounted in a manner somewhat similar to bearings 16 and 17. For this purpose, the outer race of bearing 14 (Fig. 19) is snugly fitted in an opening 67 formed in an upward extending bracket 68 of the gyro base 11. This outer race is held in place by a plate 69 secured to the side of the bracket 68 by screws 70. The inner race of bearing 14 is slideably fitted over a trunnion 71 formed integral with a vertical cross member 72 of the outer gimbal. The inner race is clamped in place by a clamp nut 73 threaded over the outer end of the trunnion 71, which nut is effective, through a washer 74 to lock the rotor 75 of a second control transformer 76 and the inner race of bearing 14 in place on the trunnion 71. The stator 77 of the transformer is suitably secured to the bracket 68.

An open slot 78 having a width slightly greater than the diameter of trunnion 71 extends from the top of the bracket 68 to the bearing opening 67 to permit the trunnion to be passed laterally therethrough in replacing the outer gimbal assembly and after the nut 73, the transformer 76 and the bearing 14 have been removed.

The outer race of bearing 13 is snugly fitted in the bearing opening 80 formed in a second bracket 81 extending upwardly from the base 11 and is held in place by an annular nut 82 threaded in the bracket 81. The inner race of bearing 13 is slideably fitted over a trunnion 83 formed integrally with a vertical cross member 84 of the outer gimbal. A vertically extending open slot 85 is formed in the bracket 81 and opens into the opening 80 to permit trunnion 83 to be passed transversely therethrough when the nut 82 and bearing 13 are removed.

For the purpose of supplying current to the motor 21 and for transmitting electrical information from the control transformer T associated with the inner gimbal 15 in different positions of the gimbals relative to the base, slip ring assemblies, generally indicated at 87 and 88 (Figs. 18 and 19), are mounted on the outer gimbal and base 11, respectively. Since these assemblies are similar in all respects except for the number of slip rings and electrical connections, only the assembly 87 will be described in detail.

Figure 21:
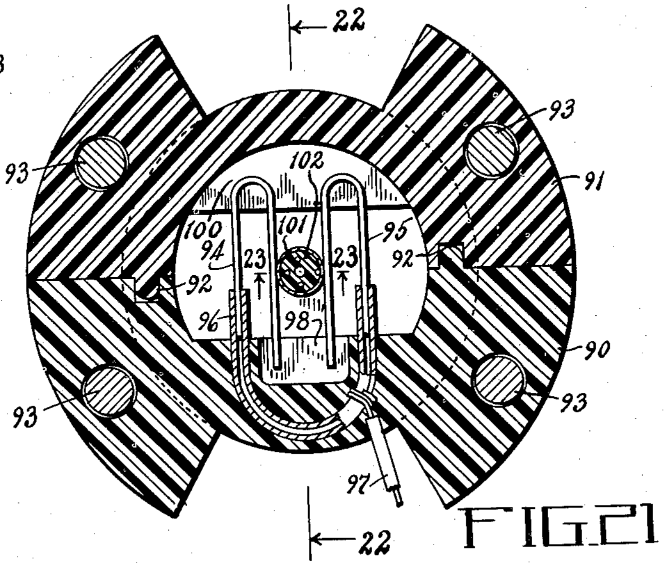
Fig. 21 is a sectional view of the slip ring and brush assembly for the inner gimbal and is taken along line 21—21 of Fig. 18.
Figure 23:
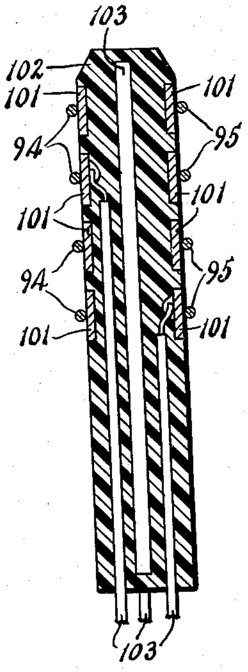
Fig. 23 is an enlarged longitudinal sectional view through the slip ring post shown in Figs. 21 and 22 and is taken along the line 23—23 of Fig. 21.
Figure 22:
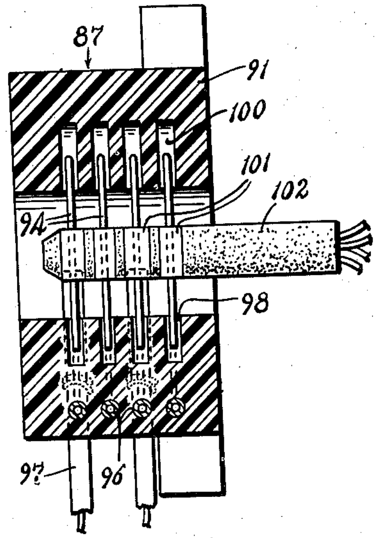
Fig. 22 is a transverse sectional view of the slip ring and brush assembly of Fig. 21 and is taken along line 22—22 of that figure.

Referring also to Figs. 21, 22 and 23, the assembly 87 comprises a half round brush holder 90 formed of insulating material such as plastic, and a mating brush guide 91, also has insulating material. These elements are located in alignment with each other by interfitting tongue and groove formations 92 and are attached to the upper cross member 61 of the outer gimbal 15 by screws 93. A plurality of pairs of spring brushes 94 and 95 are spaced along the brush holder 90, the brushes having their outer ends suitably secured in the ends of U-shaped tubular conductors 96 embedded in the holder 90. Current is applied to the conductors 96 through wires 97 attached thereto and also partially embedded in the holder. The inner free ends of the brushes are slideably guided in slots 98 formed in the holder 90. The bent over ends of the brushes are also slideably guided in slots 100 formed in the brush guide 91.

The inner legs of the brushes 94 and 95 spring in wiping contact with aligned slip rings 101 carried by a slip ring post 102 of insulating material. The latter is suitably secured in a coaxially extending opening formed in the trunnion 65 of the inner gimbal 18. Conductors 103 embedded in the post 102 connect the various slip rings to the motor 21 and stator windings of the control transformer T.

It will be noted that the screws 93 are somewhat smaller than the holes through which they pass in the brush holder 90 and brush guide 91. Thus, the holder and guide may be adjusted as a unit a slight amount to correct or balance the frictional engagement applied to the slip rings by the various brushes 94 and 95. It will be further noted that one or the other of the members 90 and 91 may be removed, for example, to adjust the nut 62, and thereafter replaced without losing any previously set adjustment. This is because of the interfitting tongue and groove formations 92.

Describing now the caging or erecting mechanism for centering the inner and outer gimbals in an initial or reference position relative to the base, it will be recalled that the inner gimbal 18 (Figs. 7, 10, 13, 14 and 15) has integrally formed thereon a caging cam 40. The latter cooperates with a caging roller 105 (Figs. 1, 5 and 7) mounted on a stud 106 carried by an arm 107 which is pivotally supported on a frame pin 108 secured to a support plate 109 for the caging mechanism. The plate 109 has depending brackets 110 (Figs. 1, 2 and 6) which are secured to the upstanding brackets 68 and 81 of the base 11 by screws 111.

The roller 105 is also engageable with the second aforementioned end cam 84 formed integrally with the outer gimbal 15.

Figure 5:
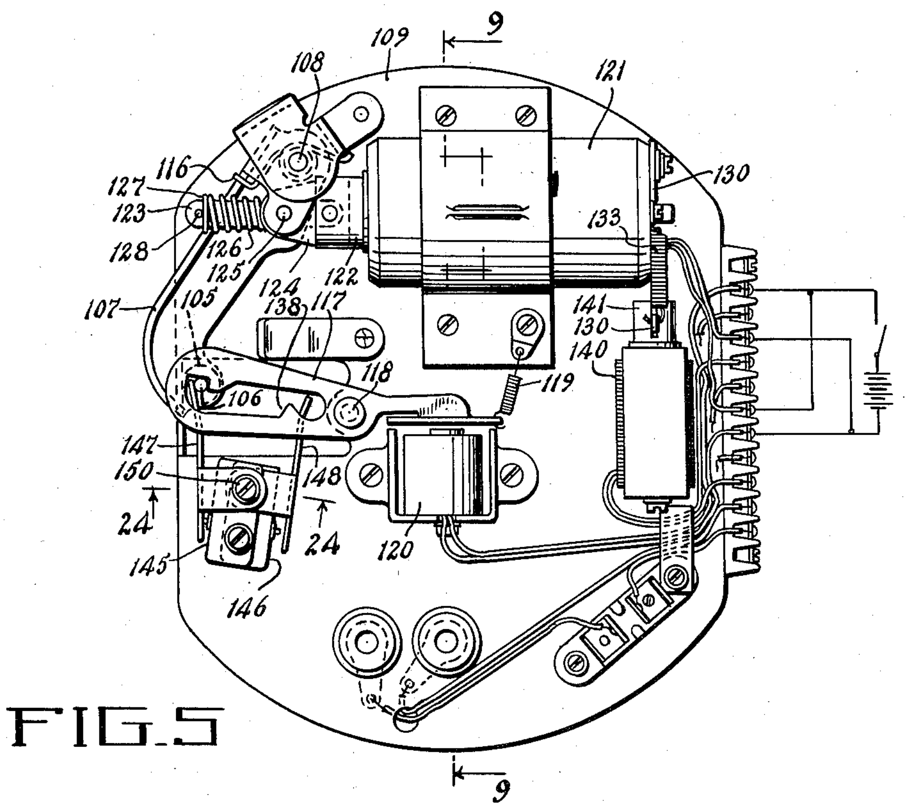
Fig. 5 is a plan view taken in the direction of the arrow 5 in Fig. 2 and illustrating the caging mechanism.

In caging the gyro, the arm 107 is yieldably forced counterclockwise, as viewed in Fig. 5, causing the stud 106 to first engage the edge of the outer gimbal cam 84 to cam the latter into its caged position wherein the stud enters a slot 114 in the edge of the cam. The stud passes into a second somewhat narrower slot in a centering plate 230 secured to the outer gimbal by screws 321 and carries the roller 105 into engagement with the periphery of the inner gimbal cam 40 to cage the inner gimbal. The roller 105 finally comes to rest in a centering notch 115 formed in the cam 40.

The caging arm 107 is urged toward its illustrated uncaged position by a torsion spring 116 surrounding the pivot 108 and is held in such position against vibration or other forces by a latch 117 pivotally supported at 118 on the plate 109. For this purpose, a latching shoulder on the latch engages a reduced portion of the stud 106 which extends above the arm 107. A spring 119 normally holds the latch 117 in its latching position.

A latch control electromagnet 120 is mounted on the plate 109 and cooperates with the right hand end of the latch to rock the same, when energized, to release the arm 107 for a caging operation.

A caging solenoid 121 is mounted on the plate 109 and is effective to move the arm 107 counter clockwise during a caging operation. The armature 122 (Fig. 20) of the caging solenoid is pivotally connected to a link 123 slideable through a U-shaped stirrup 124. The side legs of the stirrup are pivotally connected at 125 to the sides of the arm 107. A compression spring 126 is fitted over the link 123 and interposed between the stirrup 124 and a washer 127 held in place adjacent the outer end of the link 123 by cross pin 128.

During a caging operation, current is applied simultaneously to both the latch magnet 120 and the caging solenoid 121, causing the latch 117 to release the arm and causing the solenoid 121 to rock the arm 107, through spring 126, through its caging motion.

Figure 1:
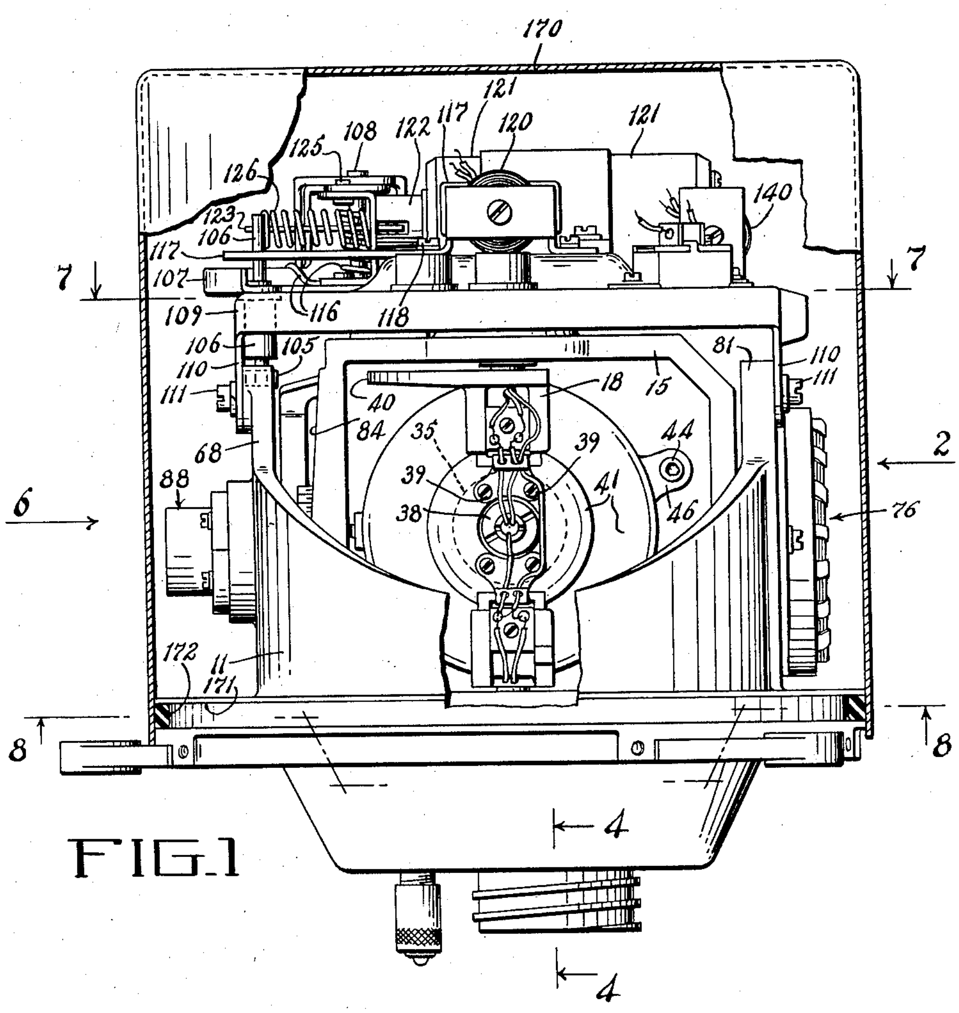
Fig. 1 is a side view, partly in section, of a gyroscope embodying a preferred form of the present invention.
Figure 9:
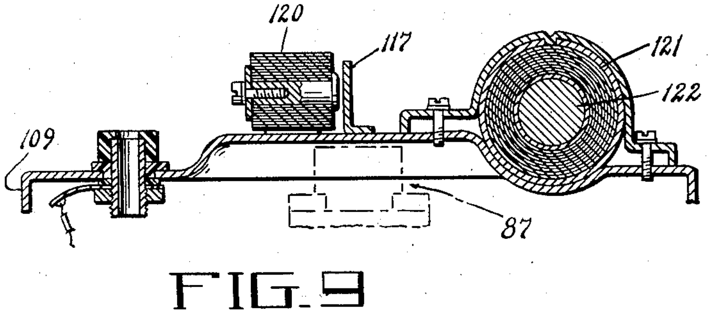
Fig. 9 is a sectional view through part of the caging mechanism and is taken substantially along the line 9—9 of Fig. 5.
Figures 2, 3, 4:
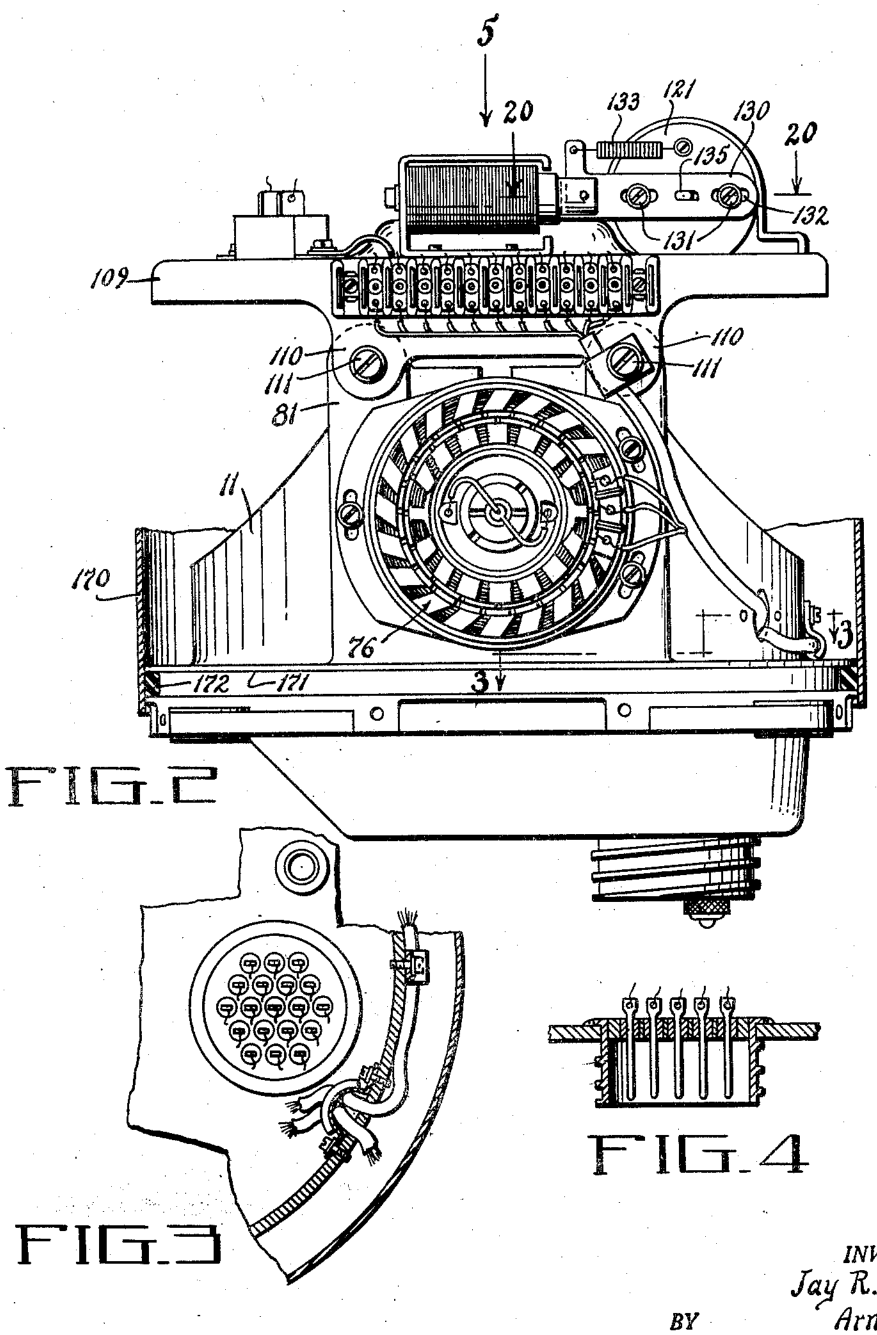
Fig. 2 is a front view of the gyroscope and is taken in the direction of arrow 2 of Fig. 1.
Fig. 3 is a fragmentary sectional view taken along line 3—3 of Fig. 2, illustrating the electrical outlet connection.
Fig. 4 is a sectional view through the electrical outlet connection and is taken along the line 4—4 of Fig. 1.
Figure 20:
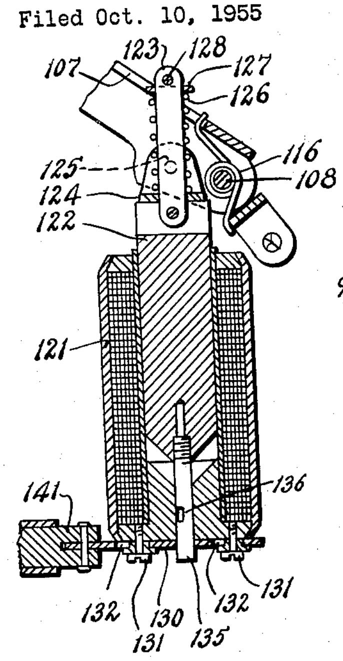
Fig. 20 is a sectional view taken along line 20—20 of Fig. 2.

As the solenoid armature 122 reaches the inner limit of its movement, which may occur before the arm 107 has completed its movement, it is held in such position by a latch 130 (Figs. 2, 5, and 20). The latter is guided by guide screws 131 extending through elongated slots 132 in the latch and secured to the body of the solenoid 121. A spring 133 tensioned between the latch 130 and a part of the solenoid 121 normally lightly urges the latch against a pin 135 secured to the solenoid armature 122. As the latter reaches its innermost position, the spring 133 is effective to force the latch 130 into a notch 136 formed in the pin.

In order to prevent abrupt jarring of the roller 105 against the periphery of cam 40 during a caging operation, the operation is performed in two stages. For this purpose, a stop shoulder 138 is formed on the latch 117, and when the latter is rocked clockwise to release the arm 107, the shoulder 138 is placed in the path of the upper end of the stud 106, thus blocking the roller in its broken line position 105*a* (Fig. 7) wherein it will be ineffective at this time to engage the periphery of cam 40. However, at this time the stud 106 will locate within the slot 114 and thus hold the outer gimbal in caged position. Thereafter, and upon release of current through the latch magnet, the spring 119 will return the latch counterclockwise to its illustrated position permitting the arm 107 to continue under the force of the now compressed spring 126 to cage the inner gimbal.

In order to uncage the gyro an uncaging solenoid 140 is mounted on the support plate 109 and has its armature 141 secured to the latch slide 130. Upon energization of the solenoid 140, it will actuate the latch slide 130, thus releasing the solenoid armature 122 to permit the spring 116 to return the arm 107 clockwise to its illustrated uncaged position.

Figure 24:
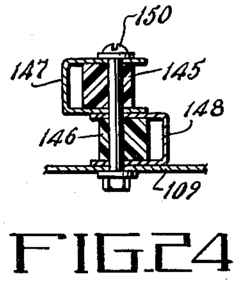
Fig. 24 is a sectional view illustrating the limit switch levers and their pivotal support, and is taken along the line 24—24 of Fig. 5.
Figure 6:
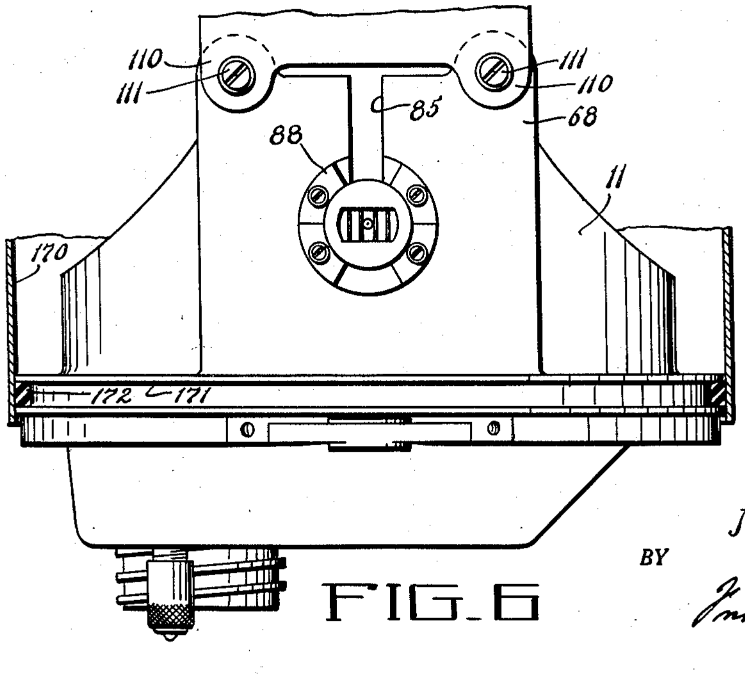
Fig. 6 is a rear side view, with parts broken away, and is taken in the direction of the arrow 6 in Fig. 1.
Figure 7:
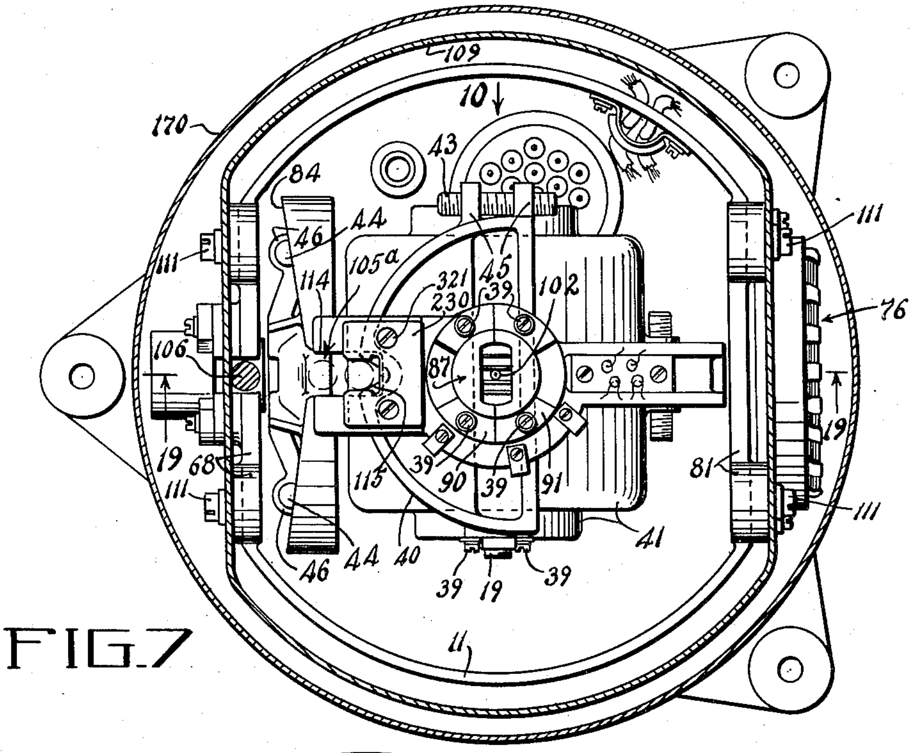
Fig. 7 is a sectional plan view taken along the line 7—7 of Fig. 1.
Figure 8:
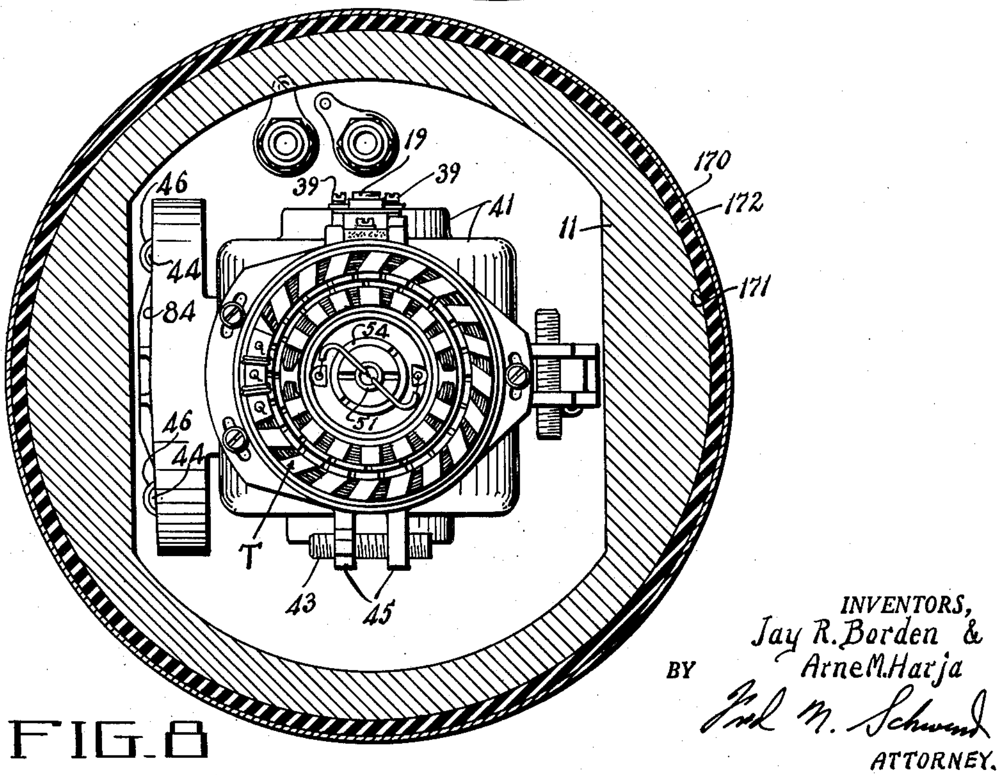
Fig. 8 is a bottom sectional plan view taken along the line 8—8 of Fig. 1.

Switch means are provided to indicate the caged and uncaged condition of the gyro. The latter comprises two limit switches 145 and 146 (Figs. 5 and 24) suitably mounted on the support plate 109. Actuating levers 147 and 148 for respective ones of the switches are pivotally mounted on a support pin 150 and are located in the path of the stud 106. The switches are located in circuit with suitable indicating means (not shown). Thus, when the gyro is in its uncaged condition, as shown in Fig. 5, the switch lever 147 will be held in a rocked position to close switch 145 whereas when the gyro is in its fully caged position, the stud 106 will hold the switch lever 148 in a rocked position, closing switch 146.

The operating parts of the gyro are sealed from contact with the atmosphere to reduce corrosion, etc. For this purpose, a shell 170 (Fig. 1) is placed over the gyro and fitted snugly over a portion of the base 11. A circumferentially extending groove 171 is formed in the base to receive a sealing ring 172 of rubber or the like which engages the inner surface of the shell.

Although we have described our invention in detail and have therefore used certain terms and language herein, it is to be understood that the present disclosure is illustrative rather than restrictive and that changes and modifications may be made without departing from the spirit or scope of the invention as set forth in the claims appended hereto. For example it will be noted that the invention, at least in its broader aspects, may be applied to different forms of gyroscopic devices such as amount gyros, rate gyros, direction indicating gyros, attitude indicating gyros, etc.

Having thus described the invention, what we desire to secure by United States Letters Patent is:

1. A gyroscopic device comprising a rotor, a support supporting said rotor for movement about its spin axis, a gimbal pivotally supporting said support for movement about a second axis perpendicular to said spin axis, a base pivotally supporting said gimbal for movement about an axis perpendicular to said second axis, caging cams connected to said gimbal and to said support, a cam follower carried by said base and successively engageable with said caging cams whereby to cage said gimbal and said support in predetermined attitudes relative to said base, an actuating device movable through an actuating stroke for operating said cam follower, means forming a spring connection between said actuating device and said cam follower, a latch for latching said cam follower in an uncaged position, and means for concurrently operating said actuating device to actuate said cam follower and operating said latch to release said cam follower.

2. A gyroscopic device comprising a rotor, a support supporting said rotor for movement about its spin axis, a gimbal pivotally supporting said support for movement about a second axis perpendicular to said spin axis, a base pivotally supporting said gimbal for movement about an axis perpendicular to said second axis, caging cams connected to said gimbal and to said support, a cam follower carried by said base and successively engageable with said caging cams whereby to cage said gimbal and said support in predetermined attitudes relative to said base, means for actuating said cam follower, a latch effective in one position thereof for latching said cam follower in an uncaged position, said latch being effective in a second position thereof to latch said cam follower in a position engaging one only of said cams, and means for alternatively moving said latch between said first position and said second position.

3. A gyroscopic device comprising a rotor, a support supporting said rotor for movement about its spin axis, a gimbal pivotally supporting said support for movement about a second axis perpendicular to said spin axis, a base pivotally supporting said gimbal for movement about an axis perpendicular to said second axis, caging cams connected to said gimbal and to said support, a cam follower carried by said base and successively engageable with said caging cams whereby to cage said gimbal and said support in predetermined attitudes relative to said base, an actuating device for yieldably operating said cam follower, a latch having a latching shoulder effective in one position of said latch to latch said cam follower from engaging said cams, said latch having a second latching shoulder effective in a second position of said latch to latch said cam follower from engaging said second cam, and means for moving said latch from one of said positions to the other.

4. A gyroscopic device comprising a rotor, a support supporting said rotor for movement about its spin axis, a gimbal pivotally supporting said support for movement about a second axis perpendicular to said spin axis, a base pivotally supporting said gimbal for movement about an axis perpendicular to said second axis, caging cams connected to said gimbal and to said support, respectively, a cam follower carried by said base and successively engageable with said caging cams whereby to cage said gimbal and said support in predetermined attitudes relative to said base, means for controlling movement of said cam follower, said controlling means including an electromagnetic device adapted to be conditioned in an energized state and in a deenergized state; said controlling means being effective in one of said states of said electromagnetic device to cause said cam follower to engage one only of said cams and effective in another of said states to cause said cam follower to engage the other of said cams.

References Cited in the file of this patent

UNITED STATES PATENTS

| | | |
|---|---|---|
| 2,580,748 | Fillebrown | Jan. 1, 1952 |
| 2,674,891 | Konet | Apr. 13, 1954 |

FOREIGN PATENTS

| | | |
|---|---|---|
| 717,349 | Great Britain | Oct. 27, 1954 |